(12) United States Patent
Greer

(10) Patent No.: US 6,202,833 B1
(45) Date of Patent: Mar. 20, 2001

(54) CONVEYOR BELT WITH VARIABLE SPACING

(75) Inventor: David L. Greer, Amherst, NH (US)

(73) Assignee: Wire Belt Company of America, Londonderry, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/371,139

(22) Filed: Aug. 9, 1999

Related U.S. Application Data

(63) Continuation-in-part of application No. 08/803,390, filed on Feb. 20, 1997, now Pat. No. 5,950,807.

(51) Int. Cl.[7] .................................................. B65G 17/06
(52) U.S. Cl. ........................ 198/851; 198/848; 198/850; 198/852
(58) Field of Search ................................. 198/848, 850, 198/851, 852

(56) References Cited

U.S. PATENT DOCUMENTS

| 2,862,602 | 12/1958 | Greer et al. | 198/182 |
| 4,410,083 | * 10/1983 | Poerink | 198/853 |
| 4,754,871 | 7/1988 | Gustafson | 198/848 |
| 4,846,339 | * 7/1989 | Roinestad | 198/852 |
| 5,158,171 | 10/1992 | Graff | 198/848 |
| 5,334,440 | 8/1994 | Halterbeck et al. | 428/222 |
| 5,375,695 | 12/1994 | Daringer et al. | 198/778 |
| 5,404,998 | * 4/1995 | Frye | 198/848 |
| 5,501,319 | 3/1996 | Larson et al. | 198/778 |
| 5,950,807 | * 9/1999 | Greer | 198/850 |

OTHER PUBLICATIONS

Alloy Wire Belt Company, Alloy Moves For You Brochure, , p. 3 (Flat Wire Belts), Modesto CA.
Ashworth Bros., Inc., Ashworth Brochure, 1997, pp. 8 & 11,Kingswinford West Midlands U.K.
Ashworth Bros., Inc. Ashworth Belts Brochure, 1994, p. 4 (Figs 9 & 10), Winchester VA.
ESFO B. V., Your partner in conveyor belt automation, 1998,,,.
Cambridge, Inc., Wire Belt Brochure,, pp. 14–17,,.
Martens, Conveyor Belt Leaflet, 1998,,,.
Martens, Transportbänder Conveyor Belts, 1994,,,.

* cited by examiner

Primary Examiner—Christopher P. Ellis
Assistant Examiner—Khoi H. Tran
(74) Attorney, Agent, or Firm—Bourque & Associates, P.A.

(57) ABSTRACT

The conveyor belt includes a plurality of links having alternating wide linking portions and narrow linking portions. The wide and narrow linking portions preferably form an undulating shape. In one embodiment, the conveyor belt is a flat wire conveyor belt having linking rods extending through apertures in the alternating wide and narrow linking portions. In another embodiment, the conveyor belt is a balanced weave belt having wire links woven around linking rods to form the wide and narrow linking portions.

20 Claims, 3 Drawing Sheets

CONVEYOR BELT WITH VARIABLE SPACING

RELATED APPLICATIONS

This application is a continuation-in-part of Ser. No. 08/803,390 filed Feb. 20, 1997 and entitled WIRE BELT WITH VARIABLE SPACING AND METHOD OF MAKING, now U.S. Pat. No. 5,950,807.

FIELD OF THE INVENTION

The present invention relates to conveyor belts and in particular, to a conveyor belt, such as a flat wire belt or balanced weave belt, having conveyor belt links with alternating wide and narrow regions.

BACKGROUND OF THE INVENTION

Conveyor belts are commonly used for conveying articles during cooling, drying, coating, cooking and many other applications. Examples of conveyor belts used for such applications include wire mesh belts, flat or ribbon wire belts (also referred to as honeycomb belts), and balanced weave belts. One example of a flat wire belt is disclosed in U.S. Pat. No. 5,501,319, incorporated herein by reference. One example of a balanced weave belt is disclosed in U.S. Pat. No. 5,375,695, incorporated herein by reference. Each of these belts are advantageous, for food processing in particular, because they provide flexibility, an open, flow-through construction, a sanitary construction, simple installation and maintenance, and the ability to be positively driven Conveyor belt manufacturers have always searched for ways to reduce the amount of material and time needed to manufacture these conveyor belts as well as to reduce the weight. Prior attempts at reducing weight and material, however, have resulted in a significant decrease in belt strength. Reducing belt material can also result in larger spaces through the belt that allow smaller articles to fall through.

Accordingly, what is needed is a conveyor belt having less material and a lighter weight without significantly decreasing the belt strength and without creating excessively large spaces.

SUMMARY OF THE INVENTION

The present invention features a conveyor belt. The conveyor belt includes a plurality of links each of which is linked with at least one adjacent wire link in the conveyor belt. Each link includes a first end and a second end and a plurality of linking portions between the first end and the second end. The plurality of linking portions are linked with respective linking portions in an adjacent link. The plurality of linking portions include alternating narrow linking portions and wide linking portions that alternate from proximate the first end to proximate the second end of each of the links. The wide linking portions have a width greater than the width of the narrow linking portions. The narrow linking portions and wide linking portions are linked with respective narrow linking portions and wide linking portions in the adjacent wire link forming narrow spaces and wide spaces. Alternating the wide linking portions and narrow linking portions reduces the amount of material needed for the conveyor belt.

Each link preferably includes an odd number of linking portions where the number of wide linking portions equals the number of narrow linking portions minus one. Each of the plurality of links preferably has first and second of the narrow linking portions located at the first and second ends of the links. The width of the narrow linking portions is preferably dimensioned to receive a sprocket, for driving the conveyor belt.

According to one preferred embodiment, the present invention features a flat wire conveyor belt. The flat wire conveyor belt comprises a plurality of flat wire links. Each of the flat wire links comprises a first end and a second end, and a plurality of linking portions between the first end and the second end. The linking portions include alternating wide linking portions and narrow linking portions that alternate from proximate the first end to proximate the second end of each of the wire links. Each of the linking portions also have an aperture extending therethrough. A linking rod extends through the aperture in each of the linking portions to link each of the flat wire links to adjacent flat wire links. The linking rod is secured at first and second rod ends to edges of the belt, for example, by welding or clinching.

According to another preferred embodiment, the conveyer belt is a balanced weave belt having wire links woven around linking bars.

The present invention also features a flat wire link for use in a flat wire conveyor belt. The flat wire link includes a first end and a second end, and a plurality of linking portions between the first end and the second end. Each of the plurality of linking portions includes apertures for receiving a linking rod for linking the linking portions to adjacent flat wire links in the conveyor belt. At least some of the linking portions include alternating wide linking portions and narrow linking portions. The wide linking portions having a width greater than a width of the narrow linking portions.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
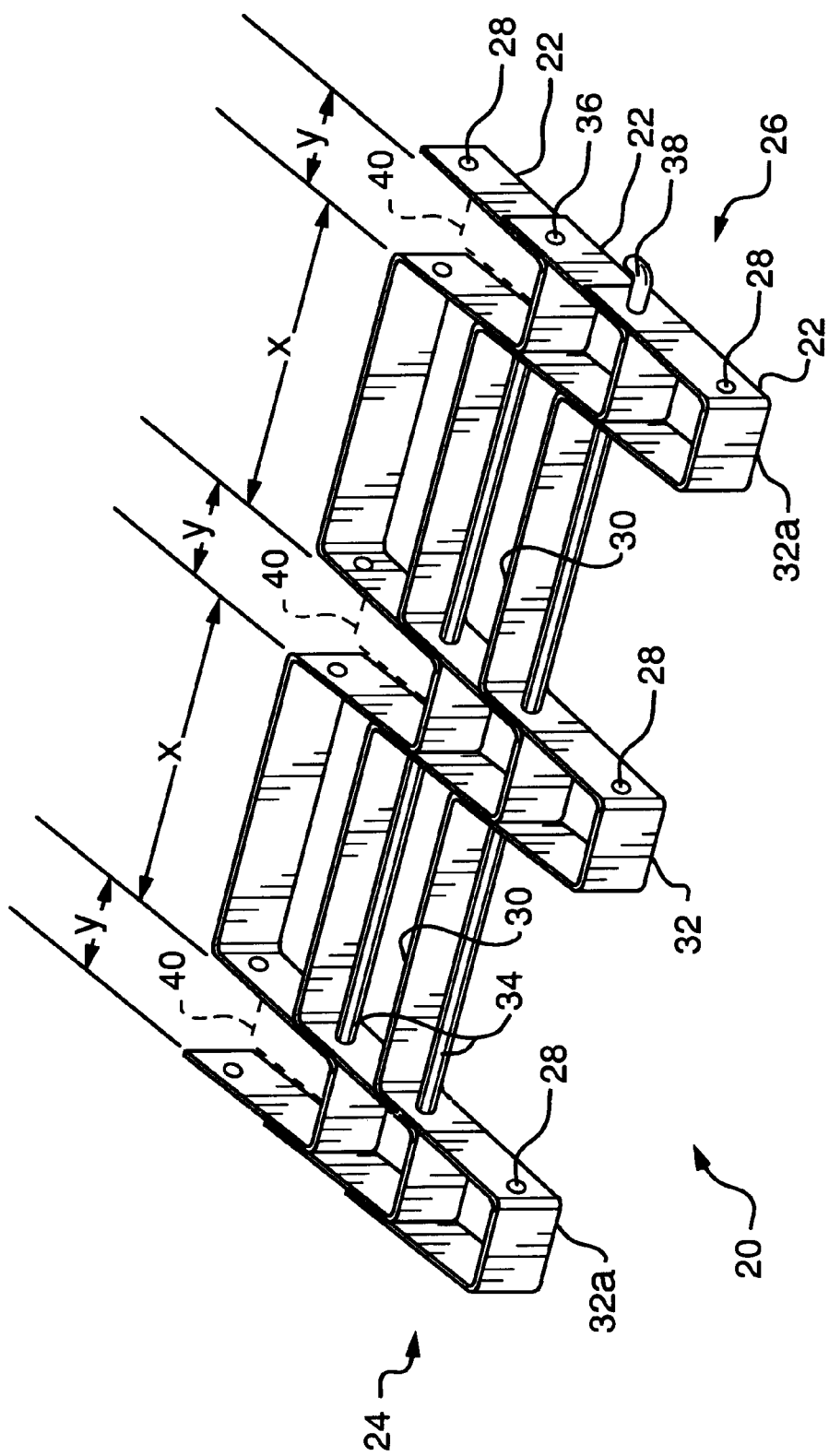
FIG. 1 is a perspective view of a section of a flat wire conveyor belt, according to one embodiment of the present invention.

A flat wire conveyor belt 20, FIG. 1, according to one embodiment of the present invention, includes a plurality of flat wire links 22 having first and second ends 24, 26 and alternating wide and narrow linking portions 30, 32 (often referred to as pickets). Although the exemplary embodiment shows a specific number of linking portions 30, 32, the present invention contemplates any number of linking portions 30, 32.

The flat wire conveyor belt 20 also includes linking rods 34 extending through apertures 28 in the linking portions 30, 32, thereby linking the flat wire links 22 to adjacent flat wire links 22. The ends of the linking rods 34 are secured to the respective ends 24, 26 of the flat wire links 22, for example with a welded button head 36 or with a clinched end 38. The plurality of flat wire links 22 are preferably linked with linking rods 34 to form an endless flat wire conveyor belt.

The alternating wide and narrow linking portions 30, 32 in each flat wire link 22 preferably form an undulating shape. Although a modified square sine wave shape is shown in the exemplary embodiment, other shapes are contemplated. The flat wire links 22 can be made of stainless steel or any other suitable metal or non-metal material.

The wide linking portions 30 have a width X that is greater than the width Y of the narrow linking portions 32. The larger space or width X is variable and can depend on the size of the articles to be conveyed. The narrower space or width Y is preferably dimensioned to receive drive sprockets 40 used to drive the conveyor belt 20. In one preferred embodiment, the flat wire conveyor belt 20 is formed by essentially dropping or eliminating every other picket from a conventional flat wire conveyor belt. As a result, the larger width X is preferably at least about twice the narrower width Y to effectively reduce the material used and the weight of the belt 20.

The conveyor belt 20 preferably includes narrow linking portions 32a, 32b proximate the first and second ends 24, 26 of the flat wire links 22, to drive the conveyor belt 20 with sprockets 40 close to the first and second ends 24, 26 of the wire links 22. Driving the conveyer belt 20 with sprockets 40 positioned in narrow linking portions 32a, 32b at the ends 24, 26 reduces the chance of belt failure caused by stress imposed by the drive sprockets 40. Alternatively, the conveyor belt can have wide linking portions proximate first and second ends 24, 26.

The exemplary embodiment shows each wide linking portion 30 having substantially the same width X and each narrow linking portion 32 having substantially the same width Y. The present invention, however, contemplates wide linking portions 30 of varying widths and narrow linking portions 32 of varying widths, provided that the alternating wide linking portions 30 and narrow linking portions 32 match with respective wide linking portions 30 and narrow linking portions 32 of adjacent wire links 22.

The preferred embodiment includes wide linking portions 30 and narrow linking portions 32 that alternate along the entire width of each flat wire link 22 from the first end 24 to the second end 26. In the exemplary embodiment, the number of wide linking portions 30 is equal to the number of narrow linking portions 32 minus one. According to other alternatives, the wide linking portions 30 and narrow linking portions 32 can alternate along only one or more portions of each flat wire link 22 with the remaining linking portions being of the same width.

Figure 2:
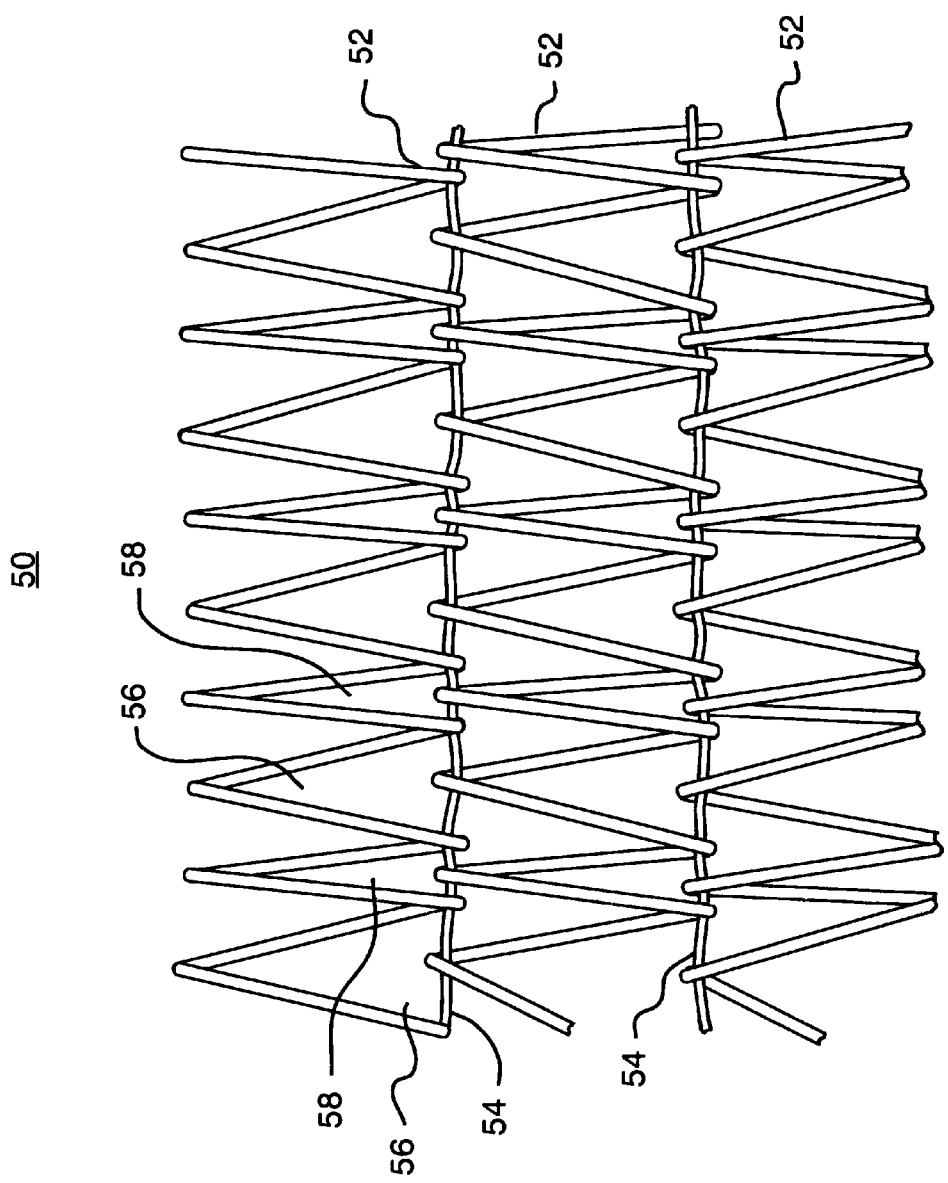
FIG. 2 is a top view of a section of a balanced weave belt, according to another embodiment of the present invention.
Figure 3:
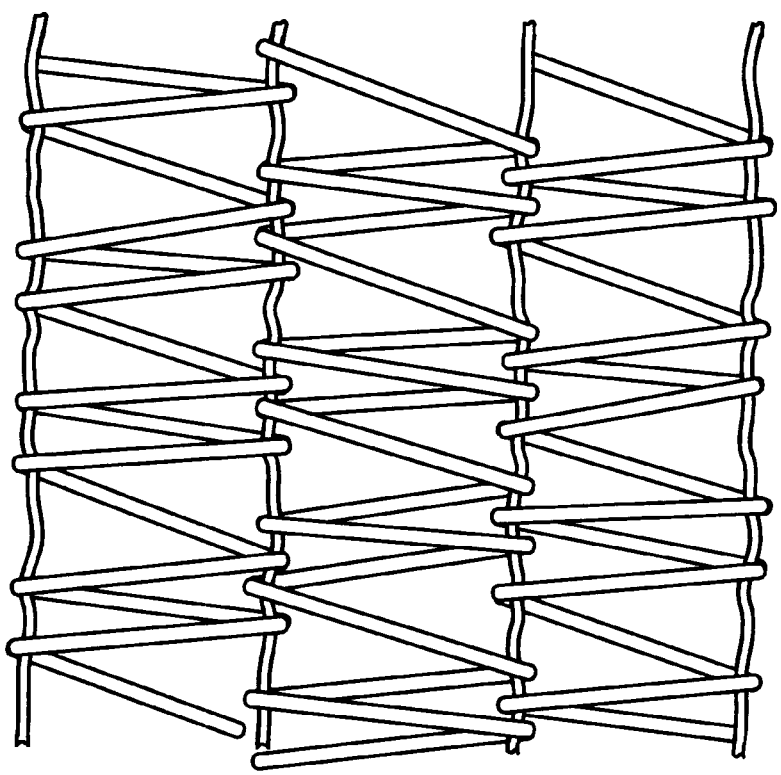
FIG. 3 is a top view of a section of a balanced weave belt, according to a further embodiment of the present invention.

According to another embodiment, a balanced weave belt 50, FIG. 2, includes a plurality of wire links 52 woven around linking rods 54. The wire links 52 are woven to form alternating wide and narrow linking portions 56, 58 along at least a portion of the balanced weave belt 50. Although the wide and narrow linking portions 56, 58 are shown as having a consistent wide and narrow spacing, varying wide and narrow spacings are also contemplated. Another variation of the balanced weave belt 60 is shown in FIG. 3. The balanced weave belt 50, 60 essentially eliminates every other weave in conventional balanced weave belts 50, 60, thereby eliminating material.

Although the exemplary embodiments show a flat wire belt (FIG. 1) and a balanced weave belt (FIGS. 2 and 3), the concept of alternating wide and narrow linking portions or eliminating linking portions can be used with any type of conveyor belts.

Accordingly, by alternating wide linking portions and narrow linking portions along a link, a conveyor belt can be formed with less material, in less time, and having a lower weight. Depending upon the materials used, this lighter conveyor belt can be made without reducing the belt strength.

Modifications and substitutions by one of ordinary skill in the art are considered to be within the scope of the present invention which is not to be limited except by the claims which follow.

What is claimed is:

1. A conveyor belt comprising:
   a plurality of links, each of said plurality of links being linked with at least one adjacent link in said conveyor belt, each of said plurality of links comprising:
   a first end and a second end; and
   a plurality of linking portions between said first end and said second end, said plurality of linking portions being linked with respective linking portions in said at least one adjacent link, said plurality of linking portions including alternating wide linking portions and narrow linking portions, wherein said narrow linking portions and wide linking portions alternate from proximate said first end to proximate said second end of each said plurality of links, said wide linking portions having a width greater than a width of said narrow linking portions, said narrow linking portions and said wide linking portions being linked with respective narrow linking portions and wide linking portions in said at least one adjacent link.

2. The conveyor belt of claim 1 wherein said links are flat wire links, and further including a linking rod extending through said plurality of linking portions to link said plurality of linking portions with said respective linking portions in said at least one adjacent link.

3. The conveyor belt of claim 1 wherein said plurality of linking portions have an undulating shape.

4. The conveyor belt of claim 3 wherein said undulating shape of said plurality of linking portions is a substantially square wave.

5. The conveyor belt of claim 1 wherein each of said plurality of links further comprises an odd number of said plurality of linking portions, and wherein a number of said wide linking portions equals a number of said narrow linking portions minus one.

6. The conveyor belt of claim 1 wherein each of said plurality of links has first and second of said narrow linking portions located at said first and second ends of said links.

7. The conveyor belt of claim 1 further including a linking rod between adjacent links, wherein said links are wires woven around said rod.

8. The conveyor belt of claim 2 wherein each of said linking rods includes first and second ends secured at edges of said belt.

9. The conveyor belt of claim 8 wherein said first and second ends include button heads welded to said edges of said belt.

10. The conveyor belt of claim 8 wherein said first and second ends are clinched at said edges of said belt.

11. The conveyor belt of claim 2 wherein said wide linking portions are at least about twice as wide as said narrow linking portions.

12. A flat wire link for use in a conveyor belt, said flat wire link comprising:
    a first end and a second end; and
    a plurality of linking portions between said first end and said second end, each of said plurality of linking portions including apertures for receiving a linking rod for linking said linking portions to adjacent flat wire links in said conveyor belt, at least some of said plurality of linking portions include alternating wide linking portions and narrow linking portions, said wide linking portions having a width greater than a width of said narrow linking portions.

13. The flat wire link of claim 12 wherein said narrow linking portions and wide linking portions alternate from said first end to said second end of said flat wire link.

14. The flat wire link of claim 12 wherein said wide linking portions are at least about twice as wide as said narrow linking portions.

15. The flat wire link of claim 12 wherein first and second of said narrow linking portions are located at said first and second ends of said flat wire link.

16. The flat wire link of claim 12 wherein each of said wide linking portions have substantially the same width, and wherein each of said narrow linking portions have substantially the same width.

17. A flat wire conveyor belt comprising:
   a plurality of flat wire links, each of said plurality of flat wire links comprising:
      a first end and a second end; and
      a plurality of linking portions between said first end and said second end, said plurality of linking portions including alternating wide linking portions and narrow linking portions, wherein said narrow linking portions and wide linking portions alternate from proximate said first end to proximate said second end of each said plurality of wire links, said wide linking portions having a width greater than a width of said narrow linking portions, each of said plurality of linking portions having an aperture extending therethrough; and
   a linking rod extending through said aperture in each of said plurality of linking portions to link each of said flat wire links to adjacent flat wire links, said linking rod secured at first and second rod ends to edges of said belt.

18. The flat wire conveyor belt of claim 17 wherein said plurality of linking portions have an undulating shape.

19. The flat wire conveyor belt of claim 3 wherein said undulating shape of said plurality of linking portions is a substantially square wave.

20. The flat wire conveyor belt of claim 17 wherein each of said plurality of flat wire links has first and second of said narrow linking portions at said first and second ends of said flat wire links.

* * * * *